US009372315B2

(12) United States Patent
Miao et al.

(10) Patent No.: US 9,372,315 B2
(45) Date of Patent: Jun. 21, 2016

(54) MICRO BI-DIRECTIONAL OPTICAL SUB-ASSEMBLY

(71) Applicant: Futurewei Technologies, Inc., Plano, TX (US)

(72) Inventors: Rongsheng Miao, San Jose, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 258 days.

(21) Appl. No.: 14/066,001

(22) Filed: Oct. 29, 2013

(65) Prior Publication Data

US 2014/0355997 A1 Dec. 4, 2014

Related U.S. Application Data

(60) Provisional application No. 61/829,818, filed on May 31, 2013.

(51) Int. Cl.
*G02B 6/42* (2006.01)
*H04B 10/40* (2013.01)

(52) U.S. Cl.
CPC .............. *G02B 6/4263* (2013.01); *G02B 6/421* (2013.01); *G02B 6/4246* (2013.01); *H04B 10/40* (2013.01)

(58) Field of Classification Search
CPC ... G02B 6/4257; G02B 6/4259; G02B 6/4263
See application file for complete search history.

(56) References Cited

U.S. PATENT DOCUMENTS 5,537,504 A * 7/1996 Cina .................... G02B 6/4204
385/93
7,093,988 B2 * 8/2006 Tsumori ............. G02B 6/4201
385/92
2003/0223131 A1 * 12/2003 Kuczynski ............. G02B 7/025
359/819
2006/0002667 A1 * 1/2006 Aronson .............. G02B 6/4206
385/93
2009/0040628 A1 * 2/2009 Vancoille ............... G02B 5/001
359/727
2009/0129783 A1 * 5/2009 Ori ....................... G02B 6/4246
398/136
2009/0226139 A1 * 9/2009 Yuang .................. G02B 6/4204
385/93
2009/0269067 A1 * 10/2009 Kihara ................ H01S 5/02212
398/79
2009/0269077 A1 * 10/2009 Sone ...................... H04B 10/40
398/135
2013/0034357 A1 * 2/2013 Lim ..................... G02B 6/4201
398/79

FOREIGN PATENT DOCUMENTS

CN 102934385 A 2/2013

OTHER PUBLICATIONS

Iwase, Masayuki, et al., "Optical Transceiver Modules for Gigabit Ethernet PON FTTH System," Furukawa Review, Issue No. 28, 2005, pp. 8-14.

(Continued)

*Primary Examiner* — Michelle R Connelly
(74) *Attorney, Agent, or Firm* — Conley Rose, P.C.; Grant Rodolph; Jonathan K. Polk (57) ABSTRACT

A BOSA package comprising only one cylindrical TO package comprising a ROSA and a TOSA, and an optical port in optical communication with the ROSA and the TOSA. Also disclosed is a TO package comprising a TOSA for transmitting a first optical signal, a ROSA for receiving a second optical signal, an optical communication window, and a TFF positioned such that the first optical signal transmitted from the TOSA is reflected by the TFF toward the optical communication window and the second optical signal received from the optical communication window passes through the TFF and to the ROSA.

18 Claims, 6 Drawing Sheets

(56) References Cited

OTHER PUBLICATIONS

Masuko, Koichiro, et al., "A Low Cost PON Transceiver using Single TO-CAN Type micro-BOSA", 2006 Electronic Components and Technology Conference, IEEE 1-4244-0152-6/06, 2006, pp. 1082-1086.

Foreign Communication of a Counterpart Application, PCT Application No. PCT/CN2014/078582, International Search Report dated Sep. 3, 2014, 7 pages.

Foreign Communication of a Counterpart Application, PCT Application No. PCT/CN2014/078582, Written Opinion dated Sep. 3, 2014, 4 pages.

* cited by examiner

Page 1

MICRO BI-DIRECTIONAL OPTICAL SUB-ASSEMBLY

CROSS-REFERENCE TO RELATED APPLICATIONS

The present application claims priority to U.S. Provisional Patent Application 61/829,818, filed May 31, 2013 by Rongsheng Miao, et. al., and entitled "Micro Bi-Directional Optical Sub-Assembly", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over the last mile. PON may be a point-to-multipoint (P2MP) network with passive splitters positioned in an optical distribution network (ODN) to enable a single feeding fiber from a central office to serve multiple customer premises. PON may employ one wavelength for upstream traffic and another for downstream traffic on a single fiber. For example, the upstream traffic may be carried by a 1310 nanometer (nm) wavelength light and the downstream traffic may be carried by a 1490 nm wavelength light. As such, a PON transceiver may employ a bi-directional optical sub-assembly (BOSA) to couple an outgoing light emitted from a transmitter optically with a single fiber and also to couple an incoming light from the single fiber to the receiver. A BOSA module may be made of a separate transmitter optical sub-assembly (TOSA) package and a receiver optical sub-assembly (ROSA) package, sealed together in a metal housing. Some BOSA modules may combine the TOSA and ROSA onto a single transistor outline (TO) package in an attempt to reduce form factor and cost.

SUMMARY

In one embodiment, the disclosure includes a BOSA package comprising only one cylindrical TO package comprising a ROSA and a TOSA, and an optical port in optical communication with the ROSA and the TOSA.

In another embodiment, the disclosure includes a TO package comprising a TOSA for transmitting a first optical signal, a ROSA for receiving a second optical signal, an optical communication window, and a thin film filter (TFF) positioned such that the first optical signal transmitted from the TOSA is reflected by the TFF toward the optical communication window and the second optical signal received from the optical communication window passes through the TFF and to the ROSA.

In another embodiment, the disclosure includes an optical routing method comprising emitting a first optical signal from an optical transmitter along a first axis, reflecting the first optical signal by a TFF at about ninety degrees along a second axis toward an optical communication port, and receiving by an optical receiver, a second optical signal from the optical communication port along the second axis via the TFF.

In yet another embodiment, the disclosure includes a BOSA package consisting essentially of a TO header comprising a top surface, a TOSA mounted to the TO header top surface, a ROSA mounted to the TO header top surface, a flat window TO cap affixed to the TO header, a lens, a plastic housing that encases the TO header, the TO cap, and the lens, and an optical connector coupled to the plastic housing, wherein the lens is positioned between the TO cap and the optical connector.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are mechanisms to integrate a TOSA and a ROSA into a single micro BOSA TO package, by way of an embodiment of a modified optical routing scheme with reconfigured optical paths, assembly placements, and utilization of molded plastic resin in place of metal. The disclosed embodiments may eliminate laser welding, reduce manufacturing complexity, and lower overall cost. In one embodiment, this disclosure describes a compact single TO header assembly comprising a TOSA, a ROSA, and a TFF, where the TOSA and ROSA may be combined efficiently by using a combination part. The combination part may comprise a TFF holder and an aspheric lens. The TO header assembly may be mounted on a top surface of a TO header encased in a housing and coupled to an optical port, which may be a receptacle or a fiber stub. The combination part, lenses, housing, and the receptacle or fiber stub may be made of a plastic resin, thus enabling epoxy bonding. In another embodiment, this disclosure describes an optical routing scheme with reconfigured upstream and downstream light paths that may facilitate the use of a single TO header, simplify alignment process, and improve performance. The disclosed embodiments may be designed for single mode fiber applications and may be suitable for optical network unit (ONU) transceivers. It should be noted that the present disclosure illustrates the optical routing scheme using an optical signal with wavelength of about 1310 nm for upstream transmission and an optical signal with wavelength of about 1490 nm for downstream reception. However, it will be understood by those skilled in the art that the optical routing scheme may be applied to optical signals with other wavelengths.

Figure 1:
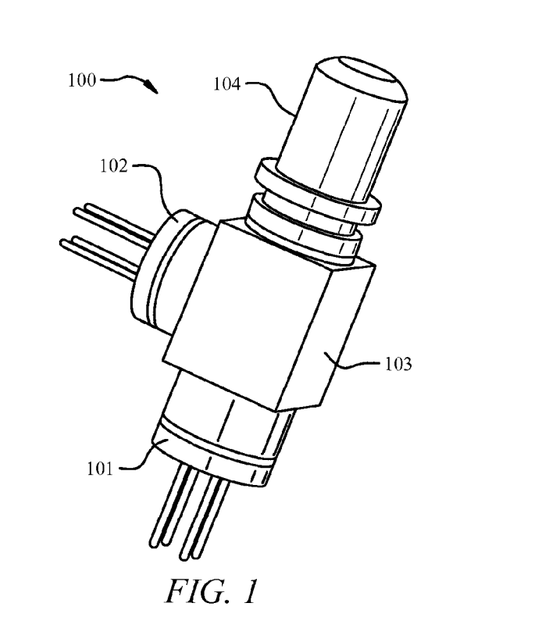
FIG. 1 is a schematic diagram of an embodiment of a BOSA module in receptacle form factor.

A BOSA module with a TOSA and a ROSA may be installed in a PON transceiver to couple light emitted from the TOSA optically to a fiber and to couple another light received from the fiber to the ROSA. A BOSA module may be available in receptacle form factor or pigtail form factor. FIG. 1 is a schematic diagram of an embodiment of a BOSA module 100 in receptacle form factor. The BOSA module 100 may comprise two hermetically sealed TO packages, a TOSA package 101 and a ROSA package 102. The TOSA package 101 and the ROSA package 102 may be bonded together with a receptacle 104 through a metal housing 103, in which a TFF may be embedded. The receptacle 104 may be a fiber connector fitted with a split sleeve holding a ferrule. The ferrule may be used for securing an optical fiber. The receptacle 104 may connect the optical fiber to the TOSA package 101 and ROSA package 102. The TFF may be used for separating a downstream optical signal and an upstream optical signal, which may be carried in different wavelengths. For example, a PON may employ upstream and downstream wavelength channels operating at 1310 nm and 1490 nm, respectively.

A TO package may include a TO header and a TO cap. The TO header may provide a top surface for mounting an optical assembly. The TO cap may be affixed to the TO header to form a seal thereby encapsulating the optical assembly within the header and cap to form a functional package. In BOSA module 100, the TOSA package 101, and the ROSA package 102 may be industry standardized TO-56 packages, where the TO header may have a diameter of about seven millimeters (mm) or less (e.g. 5.6 mm). The TO packages, 101 and 102 may further comprise other optical components. For example, the TOSA package 101 may comprise a laser diode (LD) that may emit a laser light signal for upstream transmission to the optical fiber, and the ROSA package 102 may comprise a p-i-n (e.g. an intrinsic region doped between a p-region and a n-region) photodiode (PD), or an avalanche photodiode (APD) that may convert an optical signal received from the optical fiber to an electrical signal for downstream processing.

Figure 2:
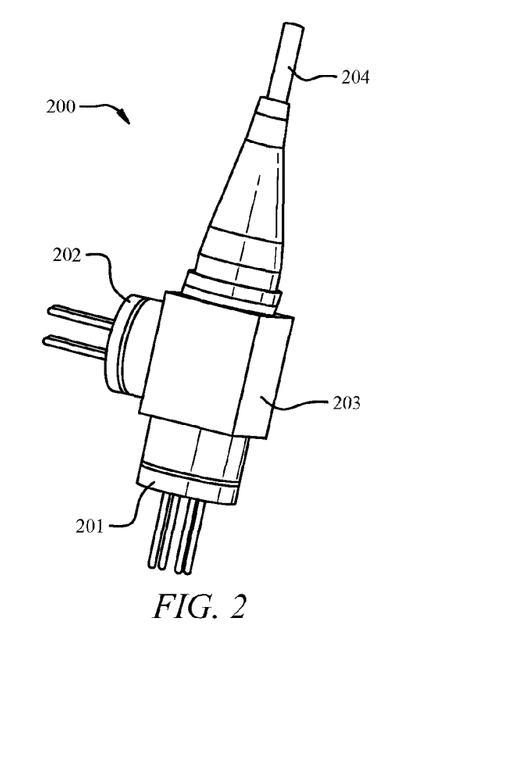
FIG. 2 is a schematic diagram of an embodiment of a BOSA module in pigtail form factor.

FIG. 2 is a schematic diagram of an embodiment of an assembled BOSA module 200 in pigtail form factor. BOSA module 200 may be substantially similar to BOSA module 100, but may comprise a fiber pigtail 204 instead of a receptacle 104. Specifically, the fiber pigtail 204 may be bonded with a TOSA package 201 and a ROSA package 202 through a metal housing 203. The fiber pigtail 204 may be a short optical fiber with an optical connector pre-installed on one end and a length of the optical fiber exposed at the other end. The fiber pigtail 204 may connect the optical fiber to the TOSA package 201 and ROSA package 202. The production of the BOSA modules 100 and 200 may require the use of laser welding and metal components, which may be costly.

Figure 3:
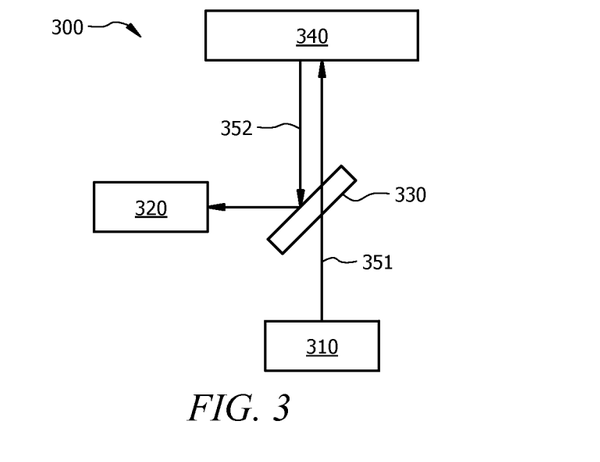
FIG. 3 is a schematic diagram of an embodiment of an optical routing scheme.

FIG. 3 is a schematic diagram of an embodiment of an optical routing scheme 300 that may be employed in a BOSA module, such as the BOSA module 100 or 200. The optical routing scheme 300 may be realized with a TFF 330, where the TFF 330 may be coated such that an optical signal of about 1490 nm wavelength may be reflected and an optical signal of about 1310 nm may pass through. The TFF 330 may be positioned at about forty-five degrees, such that an incoming downstream light 352 with wavelength of about 1490 nm from an external fiber 340 may be reflected by the TFF 330 at about ninety degrees off its original direction to reach an APD 320, while an outgoing upstream light 351 with wavelength of about 1310 nm emitted from an LD 310 may pass through the TFF 330 and couple to the external fiber 340 for transmission. The alignment between the LD 310, the TFF 330, and the external fiber 340 required in the optical routing scheme 300 may be difficult to perform.

Figure 4:
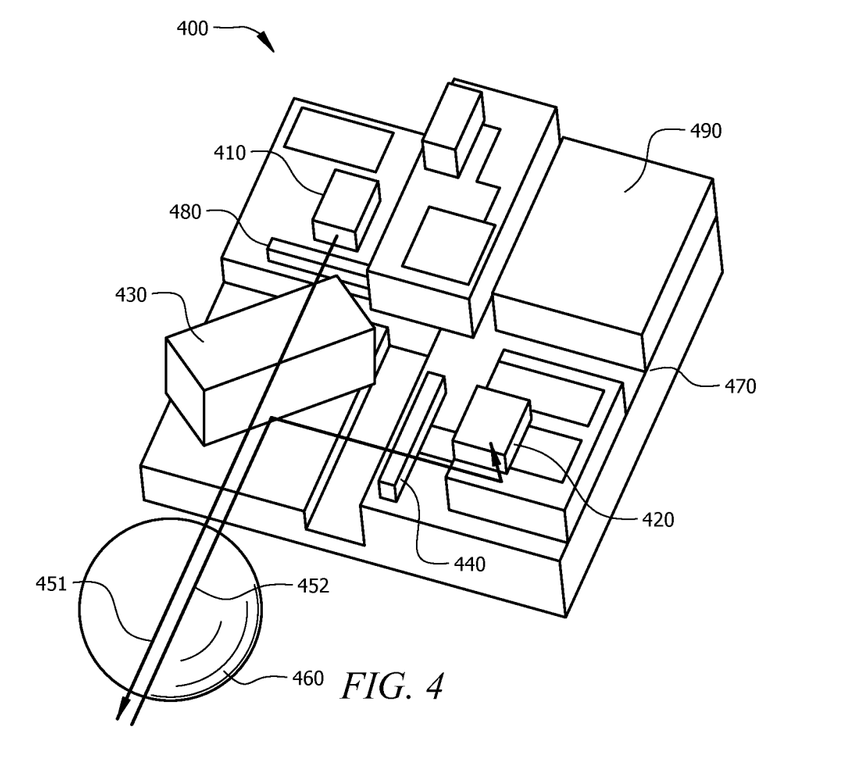
FIG. 4 is a schematic diagram of an embodiment of a micro BOSA on a silicon block.

FIG. 4 is a schematic diagram of an embodiment of a micro BOSA module 400 on a silicon block. In micro BOSA module 400, the TOSA may comprise an LD 410 and a silicon micro lens 480, and the ROSA may comprise a PD 420, a silicon micro lens 440, and a pre-amplifier 490, which may be held by a silicon block 470. The micro BOSA module 400 may employ optical routing scheme 300, where an upstream light 451, which may be substantially similar to upstream light 351, may be emitted from the LD 410, through the micro lens 480 in the upstream path, through a Wavelength Division Multiplex (WDM) filter 430, and may be coupled into an external fiber through a ball lens 460. The downstream light 452, which may be substantially similar to downstream light 352, from the external fiber may be reflected at about ninety degrees at the WDM filter 430, and may pass through the micro lens 440 in the downstream path to reach the PD 420. Although micro BOSA module 400 combines the TOSA and the ROSA into a single package, the size of the TO package remains larger than a standard TO-56 package due to the number of components required and the use of the silicon block 470 to hold the TOSA and the ROSA. Thus, the micro BOSA module 400 may require a specially made larger non-standard TO package, which may be costly. Alternatively, a planar lightwave circuit (PLC) may be employed to realize spot size conversion for direct laser coupling to and from an external fiber, instead of lenses as in the micro BOSA module 400. Although a PLC may simplify the assembly process, employing a PLC rather than lenses may lead to a high coupling loss of about four decibels (dB).

Figure 5:
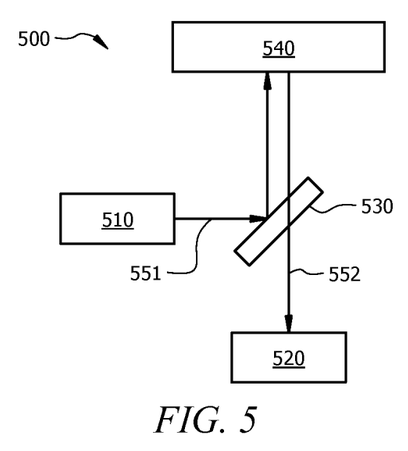
FIG. 5 is a schematic diagram of another embodiment of an optical routing scheme.

FIG. 5 illustrates an embodiment of an optical routing scheme 500. In optical routing scheme 500, the optical paths for the received downstream light and transmitted upstream light are swapped when compared to the optical routing scheme 300. The optical routing scheme 500 may be illustrated with an LD 510, an APD 520, a TFF 530, and an external fiber 540 configured as shown in FIG. 5. The LD 510 may be a semiconductor device that emits a coherent light signal suitable for fiber transmission at a TOSA. The APD 520 may be a semiconductor device that converts a light signal to an electrical signal at a ROSA for receiver processing. The TFF 530 may be an optical filter with thin film coatings that provides spectral filtering (e.g. WDM). The external fiber 540 may be coupled to an optical transmission system. For example, the LD 510 may emit an optical signal of about 1310 nm wavelength for upstream transmission, the APD 520 may receive an optical signal of about 1490 nm wavelength and convert the received optical signal to an electrical signal for downstream processing, and the TFF 530 may be coated such that an optical signal of about 1310 nm may be reflected and an optical signal of about 1490 nm may pass through. As shown in FIG. 5, an upstream light 551 with about 1310 nm wavelength emitted from the LD 510 may be reflected by the TFF 530 at about ninety degrees from the upstream light's 551 original direction and then coupled into the external fiber 540. A downstream light 552 with about 1490 nm wavelength received from the external fiber 540 may pass through the TFF 530 and couple into the APD 520. The reconfiguration of the optical paths as illustrated in the optical routing scheme 500 may enable reduction in device size and simplify alignment process.

Figure 6A:
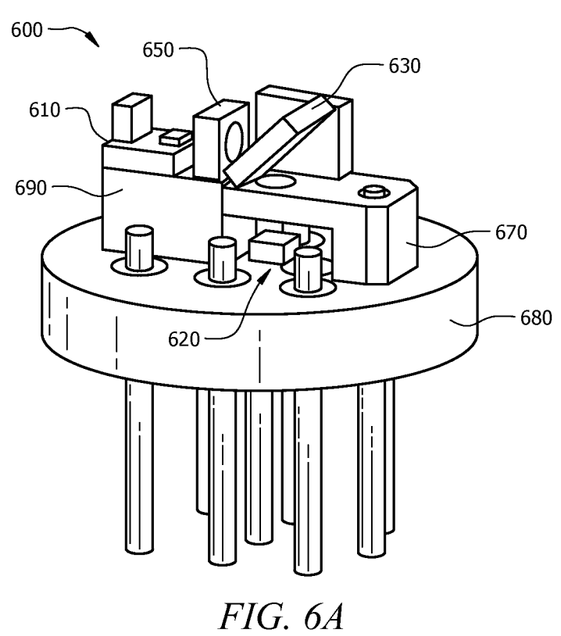
FIG. 6A is a schematic diagram of an embodiment of a TO header assembly comprising a BOSA.

FIG. 6A is a schematic of an embodiment of a TO header assembly 600, which may comprise a TOSA 610 and a ROSA 620 mounted on a top surface of a single TO header 680, and may employ the optical routing scheme 500. The TOSA 610 and ROSA 620 may further comprise other optical components. For example, the TOSA 610 may comprise an LD (e.g. LD 510) and a monitor PD, while the ROSA 620 may comprise an APD (e.g. APD 520), a transimpedance amplifier (TIA), and a capacitor. In order to facilitate the optical routing scheme 500 and to reduce the form factor of the TO header assembly 600 (e.g. TO-56), the TOSA 610, the ROSA 620, and a TFF 630, which may be substantially similar to TFF 530, may be combined and supported by using a combination part 670. The combination part 670 may be positioned on the top surface of the TO header 680. The ROSA 620 may be positioned in a space beneath the combination part 670. The TFF 630 may be mounted on the combination part 670. The TOSA 610 and a collimating lens 650 may be mounted on a metal pedestal 690 and may be positioned on a side of the combination part 670. As such, the space on the TO header assembly 600 may be fully utilized. It should be noted that a substrate may not be required to support the components in TO header assembly 600 as in the micro BOSA module 400, thus the device size may be reduced.

In TO header assembly 600, the collimating lens 650 may be a silicon lens, a ball lens, or any other lenses configured to collimate light. The cost of a ball lens may be lower than a silicon lens, but may result in a lower coupling efficiency. To further reduce cost, the TO header assembly 600 may employ lenses that are made of a plastic resin with high thermal resistance, such as ULTEM® instead of glass lenses. The lenses may also be coated with an anti-reflective coating to increase performance by reducing the amount of unwanted reflection.

Figure 6B:
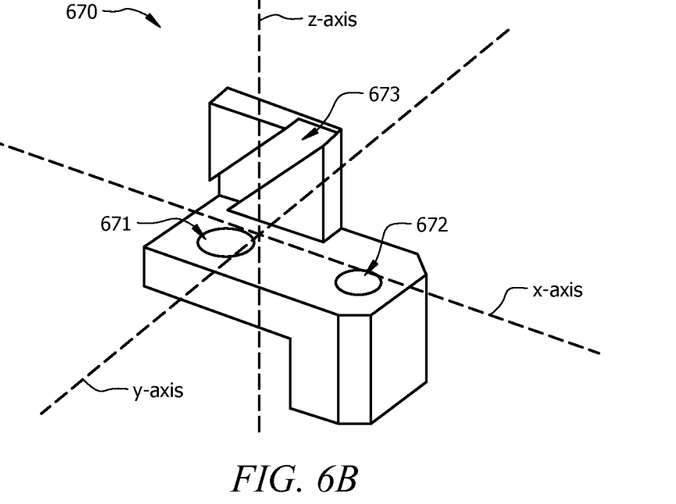
FIG. 6B is a schematic diagram of an embodiment of a combination part for combining a TOSA and a ROSA.

FIG. 6B is a schematic diagram of an embodiment of a combination part 670 for combining a TOSA and a ROSA. The combination part 670 may comprise a focusing lens 671, a through hole 672, and a slot 673. The focusing lens 671 and through hole 672 may be molded into a first plane, where the first plane is formed by the intersection of an x-axis and a y-axis at a right angle. The slot 673 may be positioned above the first plane along a z-axis. The combination part may be mounted on the top surface of the TO header, such that the first plane may be positioned parallel to the top surface of the TO header as shown in FIG. 6A. The focusing lens 671 may be an aspheric lens, a ball lens, or any other lenses configured to focus light. The through hole 672 may allow a metal pin to extend through the combination part 670 for mechanical stability and electrical connectivity. The slot 673 may be angled at about forty-five degrees with respect to the first plane. The TFF 630 of TO header assembly 600 of FIG. 6A may be positioned in the slot 673. The combination part 670, the slot 673, and the through hole 672 may be made of a plastic resin with high thermal resistance, such as ULTEM® and molded into a single piece. The focusing lens 671 may also be made of a plastic resin, such as ULTEM® and molded into the combination part 670 instead of using a separate glass lens, and may also be coated with an anti-reflective coating to reduce reflection.

In TO header assembly 600, the assembly parts may be positioned such that the optical routing scheme 500 of FIG. 5 may be realized. The TO header assembly 600 may be coupled to an optical communication window from above the TO header 680, where an external fiber (e.g. external fiber 540) may be installed. For example, the ROSA 620, the TFF 630, and the focusing lens 671 may be aligned on an axis about perpendicular to the top surface of the TO header 680, such that a downstream light received from the optical communication window may pass through the TFF 630, the focusing lens 671, and to an APD of the ROSA 620. The TOSA 610, the collimating lens 650, and the TFF 630 may be aligned on another axis about parallel to the top surface of the TO header 680, such that an upstream light emitted from an LD of the TOSA 610 may pass through the collimating lens 650 and reflect at about ninety degrees off the TFF 630 and couple into the optical communication window. This configuration may simplify the alignment process.

Figure 7:
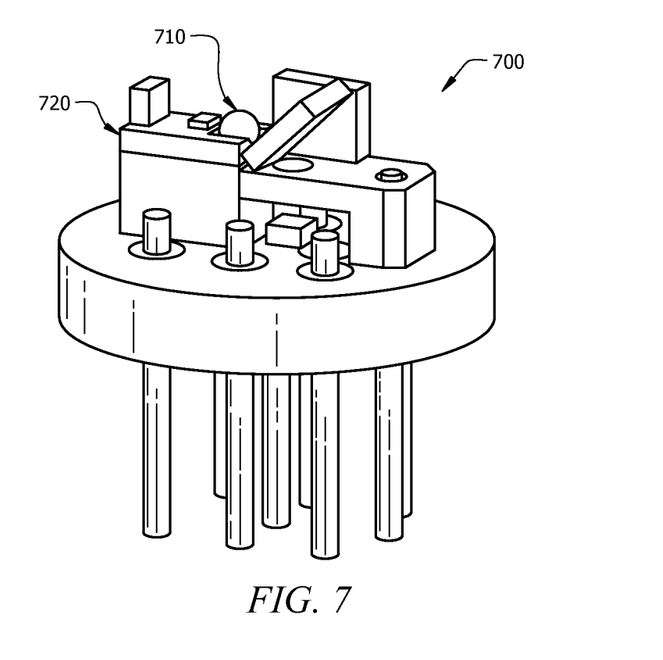
FIG. 7 is a schematic diagram of another embodiment of a TO header assembly comprising a BOSA with a ball lens.

FIG. 7 is a schematic diagram of another embodiment of a TO header assembly 700. The TO header assembly 700 may be similar to TO header assembly 600, but may comprise a ball lens 710 instead of a silicon lens 650. In order to compensate for the lower coupling efficiency in a ball lens, the ball lens 710 may be set onto a silicon v-groove substrate 720 to realize a high precision placement.

Figure 8:
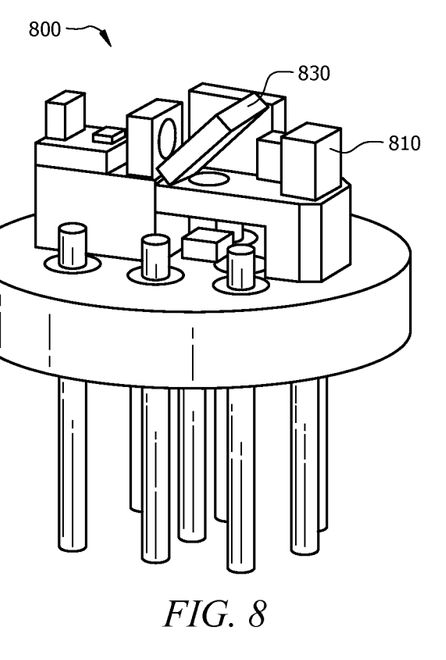
FIG. 8 is a schematic diagram of another embodiment of a TO header assembly comprising a BOSA with a monitor photodiode.

FIG. 8 is a schematic diagram of another embodiment of a TO header assembly 800. The TO header assembly 800 may be similar to TO header assembly 600, but may comprise an additional component, such as a monitor photodiode 810, to provide an additional monitoring function. The monitor photodiode 810 may be mounted on a combination part, such as the combination part 670 behind a TFF, such as the TFF 630. In this case, a TFF 830 may be coated in a manner that allows a small portion of an upstream light to pass through the TFF 830 and into the monitor photodiode 810 while most of the upstream light may still be reflected into the optical communication window for transmission. It should be noted that optional monitor photodiode 810 is only an example of an additional component and other application specific components may be substituted as needed for a specific application.

Figure 9:
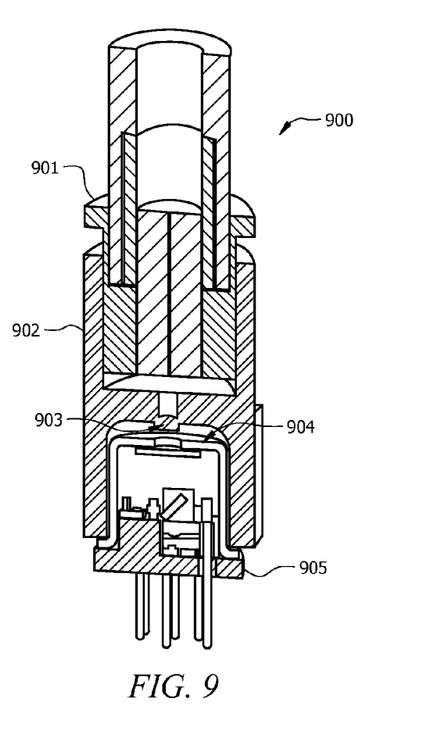
FIG. 9 is a schematic diagram of an embodiment of a micro BOSA module in receptacle form factor.

The TO header assemblies 600, 700, and 800 may be assembled into a final package in a receptacle form or a pigtail form. FIG. 9 is a schematic diagram of an embodiment of a micro BOSA module 900. In micro BOSA package 900, a TO header assembly 905 may be cap-welded with a flat window TO cap 904 into a single TO package. Then, the TO package may be bonded with an aspheric lens 903, a housing 902, and a receptacle 901 to form a micro BOSA module 900 in a receptacle form. The TO header assembly 905 may comprise any of the TO header assemblies 600, 700, or 800 as described in FIG. 6, 7, or 8, respectively. The receptacle 901 may further comprise a split sleeve and a ceramic ferrule for securing a fiber. The aspheric lens 903 may be molded inside the housing 902 with an air gap between the aspheric lens 903 and the TO cap 904. The aspheric lens 903 may focus a laser light emitted from a laser diode on the TO header to an external fiber during transmission, and collimate an incoming light from an external fiber to the TO package during reception. The housing 902, the aspheric lens 903, and the receptacle 901 may be made of a plastic resin with high thermal resistance, such as ULTEM®, rather than stainless steel. As such, an epoxy bonding process may be used instead of laser welding to bond the housing 902, aspheric lens 903, and receptacle 901.

Figure 10:
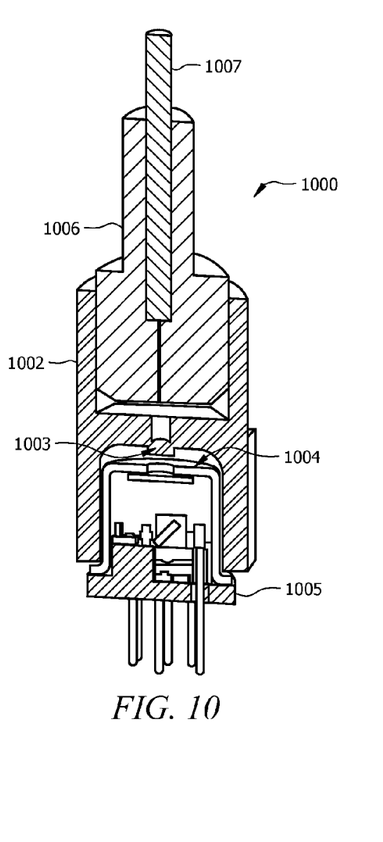
FIG. 10 is a schematic diagram of another embodiment of a micro BOSA module in pigtail form factor.

FIG. 10 is a schematic diagram of another embodiment of a micro BOSA module 1000. The micro BOSA module 1000 may be similar to micro BOSA module 900, but may comprise a fiber stub 1006 bonded with an external fiber 1007 instead of a receptacle 901. The housing 1002, the aspheric lens 1003, the TO cap 1004, and the TO header assembly 1005 may be substantially similar to the housing 902, aspheric lens 903, TO cap 904, and TO header assembly 905, respectively. The housing 1002, the aspheric lens 1003, and the fiber stub 1006 may be made of a plastic resin with high thermal resistance, such as ULTEM® and may be bonded by employing an epoxy bonding process.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. From about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A bi-directional optical sub-assembly (BOSA) package comprising:
    only one cylindrical transistor outline (TO) package comprising a receiver optical sub-assembly (ROSA), a transmitter optical sub-assembly (TOSA), a TO header, a thin film filter (TFF), and a combination part comprising a focusing lens, a slot, and a through hole: and
    an optical port in optical communication with the ROSA and the TOSA,
    wherein the TO header comprises a top surface,
    wherein the TOSA and the ROSA are mounted on the top surface,
    wherein the focusing lens and the through hole are in a first plane and adjacent to one another,
    wherein the slot is in a second plane oriented at about ninety degrees to the first plane,
    wherein the slot is angled at about forty-five degrees with respect to the first plane, and
    wherein the TFF is positioned in the slot such that the TFF is between the optical port and the focusing lens, a first optical signal transmitted from the TOSA is reflected by the TFF toward the optical port, and a second optical signal received from the optical port passes through the TFF to the ROSA.

2. The BOSA package of claim 1, wherein the TO package further comprises a TO cap affixed to the TO header.

3. The BOSA package of claim 2, further comprising an aspheric lens positioned between the TO cap and the optical port, wherein the aspheric lens focuses the first optical signal transmitted by the TOSA towards the optical port, and wherein the aspheric lens collimates the second optical signal received from the optical port to the ROSA.

4. The BOSA package of claim 3, further comprising a housing that couples to the optical port, wherein the housing encases the TO package and the aspheric lens.

5. The BOSA package of claim 4, wherein the aspheric lens is made of a molded plastic resin, and wherein the aspheric lens is molded into the housing.

6. The BOSA package of claim 4, wherein the housing and the optical port are made of a molded plastic resin, and wherein the housing and the optical port are bonded using an epoxy resin and not bonded by laser welding.

7. The BOSA package of claim 1, wherein the TO package comprises a diameter of about seven millimeters or less.

8. The BOSA package of claim 1, wherein the optical port comprises a fiber receptacle, wherein the fiber receptacle encases a split sleeve, wherein the split sleeve encases a ferrule that is configured to receive a single mode optical fiber.

9. The BOSA package of claim 1, wherein the optical port comprises a fiber stub assembled with a single mode optical fiber.

10. A transistor outline (TO) package comprising:
 a transmitter optical sub-assembly (TOSA) for transmitting a first optical signal;
 a receiver optical sub-assembly (ROSA) for receiving a second optical signal;
 an optical communication window;
 a thin film filter (TFF) positioned such that the first optical signal transmitted from the TOSA is reflected by the TFF toward the optical communication window and the second optical signal received from the optical communication window passes through the TFF and to the ROSA; and
 a combination part comprising a focusing lens, a slot, and a through hole,
 wherein the focus in lens and the through hole are in a first plane and adjacent to one another,
 wherein the slot is in a second plane oriented at about ninety degrees to the first plane,
 wherein the slot is angled at about forty-five degrees with respect to the first plane,
 wherein the TFF is positioned in the slot, and
 wherein the combination part is positioned such that the TFF is between the optical communication window and the focusing lens.

11. The TO package of claim 10, wherein the combination part is mechanically stabilized by a through pin extending through the through hole.

12. The TO package of claim 10, wherein the combination part, the focusing lens, and the through hole are made of a molded plastic resin, and wherein the focusing lens and the through hole are molded into the first plane of the combination part.

13. The TO package of claim 10, wherein the combination part further comprises a photodiode, wherein the photodiode is in the first plane, and wherein the TFF is coated such that a small portion of the first optical signal is transmitted through the TFF towards the photodiode.

14. The TO package of claim 10, further comprising a collimating lens positioned between the TOSA and the TFF, wherein the TOSA is positioned such that the first optical signal transmitted by the TOSA is transmitted through the collimating lens and reflected by the TFF at about ninety degrees into the optical communication window, and wherein the ROSA is positioned such that the second optical signal is received from the optical communication window via the focusing lens and the TFF.

15. The TO package of claim 14, further comprising a TO header and a TO cap affixed to the TO header, wherein the TO header comprises a top surface, wherein the TO header and the TO cap form a cavity that encases the ROSA, the TOSA, the collimating lens, the combination part, and the TO header, and wherein the combination part is mounted to the top surface of the TO header.

16. The TO package of claim 14, wherein the collimating lens is a silicon lens or a ball lens, and wherein the collimating lens is positioned in a silicon v-groove.

17. A bi-directional optical sub-assembly (BOSA) package consisting essentially of:
 a transistor outline (TO) header comprising a top surface;
 a transmitter optical sub-assembly (TOSA) mounted to the top surface;
 a receiver optical sub-assembly (ROSA) mounted to the top surface;
 a combination part mounted to the top surface and comprising a focusing lens a slot, and a through hole;
 a flat window TO cap affixed to the TO header;
 an aspheric lens;
 a thin film filter (TFF);
 a plastic housing that encases the TO header, the TO cap, and the aspheric lens; and
 an optical connector coupled to the plastic housing,
 wherein the aspheric lens is positioned between the TO cap and the optical connector,
 wherein the focusing lens and the through hole are in a first plane and adjacent to one another,
 wherein the slot is in a second plane oriented at about ninety degrees to the first plane,
 wherein the slot is angled at about forty-five degrees with respect to the first plane,
 wherein the TFF is positioned in the slot, and
 wherein the combination part is positioned such that the TIFF is between the optical connector and the focusing lens, a first optical signal transmitted from the TOSA is reflected by the TFF toward the optical connector, and a second optical signal received from the optical connector passes through the TFF to the ROSA.

18. The BOSA package of claim 17, wherein the optical connector is a fiber receptacle or a fiber stub assembled with an optical fiber.

* * * * *